(12) United States Patent
Crasnianski

(10) Patent No.: US 8,555,569 B2
(45) Date of Patent: Oct. 15, 2013

(54) STRUCTURE FOR RIGIDLY CONNECTING SOLAR PANELS TO A FIXTURE

(75) Inventor: Serge Crasnianski, Geneva (CH)

(73) Assignee: Institut de Recherche Fondamentale en Technologies Solaires-IRFTS, Meylan (FR)

( * ) Notice: Subject to any disclaimer, the term of this patent is extended or adjusted under 35 U.S.C. 154(b) by 72 days.

(21) Appl. No.: 13/158,793

(22) Filed: Jun. 13, 2011

(65) Prior Publication Data

US 2011/0302859 A1 Dec. 15, 2011

(30) Foreign Application Priority Data

Jun. 14, 2010 (FR) ...................................... 10 54672

(51) Int. Cl.
| | | |
|---|---|---|
| E04D 13/18 | (2006.01) | |
| F24J 2/52 | (2006.01) | |
| H01L 31/048 | (2006.01) | |
| H01L 31/042 | (2006.01) | |

(52) U.S. Cl.
USPC ...... 52/173.3; 52/506.05; 52/656.1; 126/621; 136/251; 248/237

(58) Field of Classification Search
USPC ................ 52/173.3, 506.05, 511, 552, 656.1; 126/621, 622, 623, 704; 136/244, 251; 248/237
See application file for complete search history.

(56) References Cited

U.S. PATENT DOCUMENTS

| | | | | |
|---|---|---|---|---|
| 4,090,494 A | * | 5/1978 | Borst et al. ..................... | 126/667 |
| 4,191,168 A | * | 3/1980 | Allen et al. ..................... | 126/648 |
| 4,296,740 A | * | 10/1981 | Meckler ......................... | 126/623 |
| 4,336,413 A | * | 6/1982 | Tourneux ....................... | 136/251 |
| 4,364,374 A | * | 12/1982 | Brazzola ........................ | 126/677 |
| 4,372,292 A | * | 2/1983 | Ort ................................. | 126/622 |
| 4,481,265 A | * | 11/1984 | Ezawa et al. ..................... | 429/9 |
| 4,607,616 A | * | 8/1986 | Lehmann ....................... | 126/669 |
| 4,636,577 A | * | 1/1987 | Peterpaul ....................... | 136/206 |
| 4,936,063 A | * | 6/1990 | Humphrey ...................... | 52/200 |
| 5,100,480 A | * | 3/1992 | Hayafuji ........................ | 136/249 |
| 5,164,020 A | * | 11/1992 | Wagner et al. ................. | 136/251 |
| 5,367,843 A | * | 11/1994 | Hirai et al. ..................... | 52/200 |
| 5,406,936 A | * | 4/1995 | Hirai et al. ..................... | 126/623 |
| 5,497,587 A | * | 3/1996 | Hirai et al. ..................... | 52/173.3 |
| 5,571,338 A | * | 11/1996 | Kadonome et al. ........... | 136/251 |
| 5,706,617 A | * | 1/1998 | Hirai et al. ..................... | 52/173.3 |

(Continued)

FOREIGN PATENT DOCUMENTS

| | | |
|---|---|---|
| DE | 20 2005 015 455 U1 | 2/2007 |
| EP | 2 065 944 A1 | 6/2009 |

(Continued)

*Primary Examiner* — Basil Katcheves
*Assistant Examiner* — Rodney Mintz
(74) *Attorney, Agent, or Firm* — Burr & Brown

(57) ABSTRACT

A device for integrating solar panels on a fixture, in particular a roofing framework, that includes a plurality of frames intended to accommodate the solar panels, added to the fixture, said frames being defined by a peripheral edge fitted with linear elements that project relative to the plane in which the frames are set; tightening means for holding said panels on the frames; and means for securing the frames to the fixture. The frames are openwork and cover or partially overlap each other on the edges which define them, laterally on the one hand and in the direction of the roof pitch on the other hand, the projecting linear elements with which they are fitted cooperating with each other to form a barrier seal.

14 Claims, 14 Drawing Sheets

(56) References Cited

U.S. PATENT DOCUMENTS

| | | | |
|---|---|---|---|
| 5,715,634 A * | 2/1998 | Schultz | 52/200 |
| 5,740,996 A * | 4/1998 | Genschorek | 248/237 |
| 5,787,653 A * | 8/1998 | Sakai et al. | 52/173.3 |
| 6,072,115 A * | 6/2000 | Inoue et al. | 136/244 |
| 6,111,189 A * | 8/2000 | Garvison et al. | 136/244 |
| 6,245,987 B1 * | 6/2001 | Shiomi et al. | 136/244 |
| 6,730,841 B2 * | 5/2004 | Heckeroth | 136/251 |
| 7,012,188 B2 * | 3/2006 | Erling | 136/251 |
| 7,506,477 B2 * | 3/2009 | Flaherty et al. | 52/173.3 |
| 7,509,775 B2 * | 3/2009 | Flaherty et al. | 52/173.3 |
| 7,847,185 B2 * | 12/2010 | Schwarze | 136/251 |
| 7,918,221 B2 * | 4/2011 | Warfield et al. | 126/623 |
| 8,053,663 B2 * | 11/2011 | Nakata | 136/250 |
| 8,104,239 B2 * | 1/2012 | Fath | 52/173.3 |
| 8,156,994 B2 * | 4/2012 | Armstrong | 160/328 |
| 8,186,111 B2 * | 5/2012 | Flaherty et al. | 52/173.3 |
| 8,196,360 B2 * | 6/2012 | Metten et al. | 52/173.3 |
| 8,266,846 B2 * | 9/2012 | Schoell | 52/173.3 |
| 8,387,319 B1 * | 3/2013 | Gilles-Gagnon et al. | 52/173.3 |
| 8,404,963 B2 * | 3/2013 | Kobayashi | 136/244 |
| 8,424,256 B2 * | 4/2013 | Cook et al. | 52/173.3 |
| 2004/0011354 A1 * | 1/2004 | Erling | 126/621 |
| 2006/0277845 A1 * | 12/2006 | Warfield et al. | 52/173.1 |
| 2007/0157963 A1 * | 7/2007 | Metten et al. | 136/251 |
| 2007/0227531 A1 * | 10/2007 | Garcia Cors et al. | 126/622 |
| 2008/0066801 A1 * | 3/2008 | Schwarze | 136/251 |
| 2008/0087275 A1 * | 4/2008 | Sade et al. | 126/623 |
| 2008/0169018 A1 * | 7/2008 | Miyamoto et al. | 136/251 |
| 2009/0095284 A1 * | 4/2009 | Klotz | 126/704 |
| 2009/0293932 A1 * | 12/2009 | Augenbraun et al. | 136/244 |
| 2010/0175338 A1 * | 7/2010 | Garcia Cors | 52/173.3 |
| 2010/0192479 A1 * | 8/2010 | Elliott et al. | 52/24 |
| 2010/0242381 A1 * | 9/2010 | Jenkins | 52/173.3 |
| 2010/0275974 A1 * | 11/2010 | Chan et al. | 136/251 |
| 2010/0281794 A1 * | 11/2010 | Saillard | 52/173.3 |
| 2010/0294345 A1 * | 11/2010 | Leithold et al. | 136/251 |
| 2010/0313499 A1 * | 12/2010 | Gangemi | 52/173.3 |
| 2010/0313501 A1 * | 12/2010 | Gangemi | 52/173.3 |
| 2011/0023390 A1 * | 2/2011 | Kneip et al. | 52/173.3 |
| 2011/0036028 A1 * | 2/2011 | Beck | 52/173.3 |
| 2011/0138710 A1 * | 6/2011 | Reisdorf et al. | 52/173.3 |
| 2011/0146763 A1 * | 6/2011 | Sagayama | 136/251 |
| 2011/0162639 A1 * | 7/2011 | Jeandeaud | 126/634 |
| 2011/0197954 A1 * | 8/2011 | Young et al. | 136/251 |
| 2011/0209745 A1 * | 9/2011 | Korman et al. | 136/251 |
| 2011/0253190 A1 * | 10/2011 | Farnham, Jr. | 136/244 |
| 2011/0302857 A1 * | 12/2011 | McClellan et al. | 52/173.3 |
| 2012/0060901 A1 * | 3/2012 | Schnitzer | 136/251 |
| 2012/0096781 A1 * | 4/2012 | Romesburg | 52/173.3 |
| 2012/0193310 A1 * | 8/2012 | Fluhrer et al. | 211/41.1 |
| 2012/0240490 A1 * | 9/2012 | Gangemi | 52/173.3 |
| 2012/0247540 A1 * | 10/2012 | Clarkson et al. | 136/251 |
| 2013/0055662 A1 * | 3/2013 | Gilles-Gagnon et al. | 52/173.3 |
| 2013/0102165 A1 * | 4/2013 | DuPont | 439/95 |
| 2013/0133270 A1 * | 5/2013 | West et al. | 52/58 |
| 2013/0133723 A1 * | 5/2013 | Croft et al. | 136/251 |

FOREIGN PATENT DOCUMENTS

| | | |
|---|---|---|
| EP | 2395562 A3 * | 6/2012 |
| FR | 2 929 301 A1 | 10/2009 |
| FR | 2959871 A1 * | 11/2011 |
| WO | 2008/021714 A2 | 2/2008 |

* cited by examiner

STRUCTURE FOR RIGIDLY CONNECTING SOLAR PANELS TO A FIXTURE

FIELD OF THE INVENTION

This invention relates to the field of solar panels of the Building Integrated Photovoltaics (BIPV) type, namely solar panel systems in which the photovoltaic element, in addition to providing the electricity generation function, acts as one of the structural members, such as the roof for example.

BACKGROUND OF THE INVENTION

Among the incentives initiated by the authorities, and especially the French authorities, to promote the development of non-fossil energy sources, is the concept of integration under which solar panels are given an actual protection and sealing function in the building to which they are added.

In fact, many technological solutions have been developed in order, on the one hand, to secure said solar panels to roofs, and on the other hand, to meet the specifications laid down by government in relation to this concept of integration.

One of the difficulties encountered lies in the area of the seal. To this end, a technical solution has been proposed, in the document DE-20 2005 015455, that comprises providing a seal between the solar panels and the roofing framework by means of a membrane that covers the upper face of the underlying plane plates. However, the actual panels are themselves secured to sections that are rigidly connected to the framework, for example, using screws or nails that pass through and therefore perforate said membrane, so that the seal is not guaranteed. Incidentally, this solution compels the prior installation of said membrane, thereby inducing further down time, raising the overall costs.

Custom and practice have revealed the need for a device or structure to be perfected for securing said solar panels, which, while guaranteeing the seal required on account of integration, does not compel the use of such a membrane.

Furthermore, in traditional facilities, the solar modules are connected so that continuous very high voltages, and typically of a few hundreds of volts, are obtained in order to optimize the yield of the traditional inverters to which the modules are connected, either in series, or in parallel.

These continuous high voltages mean that significant precautions have to be taken, and in particular the use of specialized cabling and connections. They carry a risk when it comes to technicians or members of the emergency services working on roofs that include said solar modules. Indeed, even if a fire breaks out, the solar modules are still able to deliver high voltages which may entail risks of electrocution for members of the emergency services such as firemen for example.

There is a known technique to overcome this problem, of using low voltage inverters such as micro-inverters for example. These types of inverters use input voltages of between 5V and 110V and are generally one in number at least per solar module. These inverters include disconnecting protection so that, in the event of a cut in the domestic power supply system, the generation of photovoltaic electricity can be stopped, in order not to risk electrocuting technicians or members of the emergency services working on the system.

Responses have already been proposed to this need to provide the solar assembly with one or more inverters of the aforementioned type.

One solution is known, for example, that comprises securing an inverter to the back of a module. This solution does work in practice, but forms a heavy block that is difficult to integrate. Additionally, because of this securing mode, a hot point is created in the module, that may affect the yield thereof.

A problem arises from the prior art related to the integration of these inverters into the solar assembly, as part of a roof integration facility.

In some cases, the fixture is covered with flat tiles made of cement, earthenware, carbon, polymer or metal or else covered with slates. There is then a problem with providing the integration device with standardized flashings that can be fitted to all types of roofing.

Up till now, to install photovoltaic systems onto this type of roof, a roofer has had to act in order to fit a specialized zinc coating to each facility. Apart from the costs generated by the labor deployed in this way, the costs are raised because specialized components have to be manufactured.

In fact, the aim of another objective specified by the invention is to simplify and standardize said flashings, whatever type of roofing is employed.

BRIEF DESCRIPTION OF THE INVENTION

Unlike solar panel systems that are to be secured after the event to a finished roof, solar panel systems of the BIPV type are placed directly onto a fixture, for example a roofing framework, so that they can be integrated directly into the roofing with no need for any additional covering.

The particular purpose of this invention is to propose a new structure for securing at least one solar panel to a fixture, and particularly to a roofing framework or any other under-roofing or sub-construction, so that the panel forms all or part of the roofing. Additionally, the structure combined with the solar panel must provide a good seal or at least reduce the risks of water infiltration into the building, and the assembly must be straightforward to install.

The invention thus proposes a device for integrating solar panels on a fixture, and in particular on a roofing framework, that includes:
  a plurality of frames intended to accommodate the solar panels, added to the fixture, said frames being defined by a peripheral edge fitted with linear elements that project relative to the plane in which the frames are set;
  tightening means to hold said panels on the frames;
  means for securing the frames to the fixture;
said frames covering or partially overlapping each other at the edges which define them, laterally on the one hand and in the direction of the pitch of the roof on the other hand, the projecting linear elements with which they are fitted cooperating with each other in order to form a barrier seal.

Put another way, the inventive rigid connection structure comes in the form of a frame, and in particular a frame cast in one piece, free from any material at its center, and therefore hollow, of standardized dimensions complementary to the standardized dimensions of the solar panels or modules, the frame being intended to be secured directly to a fixture. This frame is capable in particular of accommodating the lateral selvages of a solar panel, and it is fitted with chutes or projecting elements arranged so as to reduce water infiltration into the building. Each of the longitudinal edges of the frame includes in particular an internal chute connected to an external chute by means of a support surface. The internal chute is intended in particular to be positioned opposite the lower face of the panel, and is additionally intended for condensate recovery. The external chute is intended in particular for rainwater runoff.

The frame is thus, and according to the invention, formed by at least two longitudinal sections intended to be arranged in the direction of the pitch of the roof, also known as the rake, and upper and lower transverse sections, each of the longitudinal sections having at least external and internal longitudinal chutes connected to each other at their lateral edge by means of a longitudinal support surface intended to support all or part of a longitudinal selvage of the panel, said chutes being intended to rest on the fixture. The terms longitudinal and transverse are to be interpreted relatively. In fact, the invention may be used for panels mounted both in a "portrait" direction and in a "landscape" direction.

According to the invention, the frame defines a continuous or single piece chute, in other words provides a continuity between the chutes oriented perpendicular to the direction of the rake and the chutes oriented in the direction of the rake. This helps to drain away the runoff water, and consequently to seal the assembly.

To advantage, the free lateral edge of the external longitudinal chute of the frame forms an upward projecting chevron structure, and is capable of covering the free lateral edge of the external longitudinal chute of an adjacent frame.

This capacity for covering the longitudinal sections of adjacent frames, both in the transverse or lateral direction and in the direction of the pitch, means that the seal can be provided without necessarily using connection couplings. This represents a significant factor in terms of saving time during installation, and consequently in terms of reducing the associated costs.

Preferably, the free lateral edges of the longitudinal sections of each frame are designed so as to allow covering on the left-hand side or on the right-hand side. Covering on the left-hand side equates to covering the free lateral edge of the left-hand longitudinal section of a frame by the free lateral edge of the right-hand longitudinal section of another adjacent frame, and covering on the right-hand side equates to covering the free lateral edge of the right-hand longitudinal edge of the frame by the free edge of the left-hand longitudinal section of said other adjacent frame. The terms "left" and "right" refer to a direction perpendicular to the pitch of the roof.

According to one inventive embodiment, the lateral edge of the internal longitudinal chute which is connected to the support surface forms an upward projecting chevron structure. This particular shape means for example that a part of the lower face of the solar panel can be supported and is additionally able to form a barrier seal.

For example, the means for securing the frame to the fixture include a set of screws capable of cooperating with through orifices or machined bores implemented in the wall forming the bottom of each of the internal longitudinal chutes. Securing the frame on the internal chute guarantees a better seal to the roofing, since also, said internal chutes are not intended for the collection of runoff water (rain or snow), since they are located under the panels, and not at the junction of two adjacent panels. Incidentally, they are separated from the external chutes by a projection, guaranteeing them from any intrusion of runoff water and rainwater.

According to one inventive embodiment, the tightening means may include at least one tangent plate cooperating with at least one screw and one securing lug to prevent the longitudinal selvage of the panel from lifting when said selvage is trapped, the tangent plate being intended to be rigidly connected to a portion of one of the longitudinal sections defining the frames.

To advantage, the upper section of the frame has at least one central transverse chute and first and second lateral transverse chutes intended to rest on the fixture:

the first lateral transverse chute being connected to one of the edges of the central chute by means of a first support surface intended to support the upper transverse selvage of a first solar panel;

and the second transverse chute being connected to the other edge of the central chute by means of a second support surface intended to support the lower transverse selvage of a second solar panel arranged above the first panel in the direction of the pitch.

For example, the first chute is intended to be opposite the lower face of the first panel, and the second chute is intended to be opposite the lower face of the second panel.

To advantage, the upper section of the frame further includes a covering surface extending from the free edge of the second chute and is capable of supporting the lower transverse section of an adjacent frame arranged above said frame in the direction of the pitch.

Put another way, the lower transverse section of a first frame rests on or covers the covering surface of a second frame arranged underneath the first frame in the direction of the pitch. Preferably, the lower transverse section of the frame has a plane surface capable of resting on the covering surface.

In so doing, the end result is a covering system rather like tiles that dispenses with any leak-proof joints.

To advantage, the external longitudinal chutes and the central chute of a frame form a continuous channel. This continuous passage allows in particular the water contained in the transverse chute to drain into the longitudinal chutes. Put another way, the longitudinal chutes and the central chute form a continuous H-shaped channel.

According to one inventive embodiment, the edge of the first transverse chute connected to the first support surface forms an upward projecting chevron structure and is capable of preventing any sliding, in the direction of the pitch, of the upper selvage of the panel.

According to the invention, flashings are added to the inventive structure that are capable of cooperating with the sections defining the characteristic frame of the invention, and also fitted with projecting elements able to cooperate with the chutes of said sections. The flashings are additionally able to have a plane extension allowing the accommodation of flat tiles or slates.

According to the invention, the frame and the flashing components are made of thermo-formed plastic, possibly with a plurality of layers of different polymers. The constituent material or one of said layers has to advantage protective properties against ultra-violet radiation.

These polymers are chosen to advantage from the group that includes polyethylene, ABS (acrylonitrile butadiene styrene), PMMA (polymethyl metacrylate), polycarbonates, polyurethane, vinyl polychloride, polyamide, polystyrene, polyester and polyepoxides.

In some circumstances, and as stated in the pre-characterizing portion, a low voltage inverter or micro-inverter may be required to be associated with the solar panel. In this configuration, the inventive frame integrates an element forming a receptacle, intended to support and/or accommodate said low voltage inverter or micro-inverter, making it possible, in the event of an electricity cut on the domestic power supply system, to stop the generation of photovoltaic electricity, in order to dispense with any risk of electrocution to persons liable to intervene in this area, and in particular technicians or members of the emergency services.

To advantage, the frame and the receptacle-forming element constitute an assembly cast in one piece and made of plastic material produced by thermo-forming.

In this configuration:

either the micro-inverter, once positioned in the receptacle-forming element, is embedded in a liquid or soft (gel) coating layer which then solidifies, said layer being made of epoxy resin, silicone or polyurethane;

or the micro-inverter, once positioned in the receptacle-forming element, is bonded to the bottom thereof or secured by means of screws;

or the micro-inverter, once positioned in the receptacle-forming element, is covered by a protective lid;

or again, the micro-inverter, once positioned in the receptacle-forming element, is enclosed in a leak-tight way and joints are used to form an insulation that satisfies the standards IP55 or IP67.

According to one version of the invention, the flashings may be constituted by a plurality of elements, respectively:

a first assembly including longitudinal parts that are fitted to the external longitudinal chutes provided on the longitudinal sections defining the inventive frame, and in a way complementary thereto, a second assembly including corner parts that are fitted to the intersection between the longitudinal sections and the transverse sections of said frame;

and a third assembly including transverse parts that are fitted to the central transverse chutes provided on the transverse section defining the frame in cooperation with the longitudinal sections, and in a way complementary thereto.

According to this version, some at least of the components belonging to said first assembly include ribs arranged so as deflect the flow of the water. Additionally, these components are also able to have raised parts or ribs projecting relative to the plane that contains said components, capable of providing the flashing with a constant height for the accommodation of tiles or slates.

BRIEF DESCRIPTION OF THE DRAWINGS

Other characteristics and advantages of the invention will become clear from the description thereof given hereinafter, for information purposes and in no way restrictively, with reference to the appended figures, wherein.

DETAILED DESCRIPTION OF THE INVENTION

Figure 1:
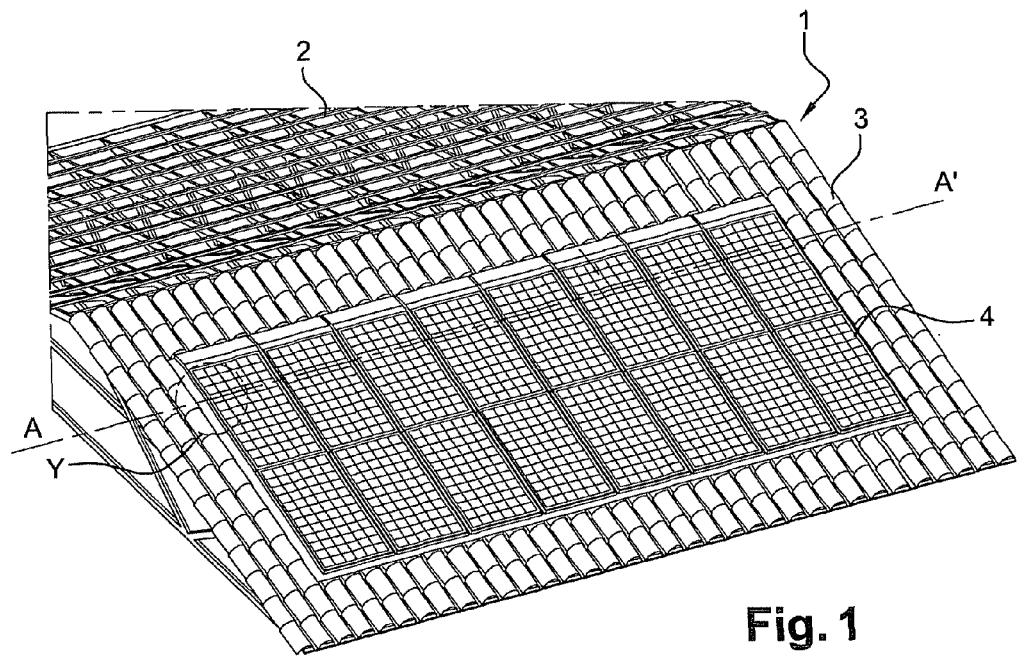
FIG. 1 is a diagrammatic representation in perspective of a roofing portion integrating a plurality of solar panels rigidly connected to the roofing framework by means of frames according to one inventive embodiment.

FIG. 1 shows diagrammatically a portion of a roof covering 1 secured directly to a fixture 2, constituted in the case in point by a wooden roofing framework. The covering 1 comprises in particular tiles 3 and solar panels 4. It may be seen that these panels are integrated into said roofing, in the sense that they help to seal it.

A panel or solar module 4 commonly comes in the form of a set of photovoltaic cells surrounded by an aluminum frame. Each of the solar modules 4 is secured directly to the fixture by means of a structure or rigid connection device.

The rigid connection structure includes in particular a plurality of frames, in the case in point one frame per solar panel, on which the selvages or edges of said panel rest, tightening means capable of holding the panel selvages on the frame, and means for securing the frame to the fixture.

Figure 2:
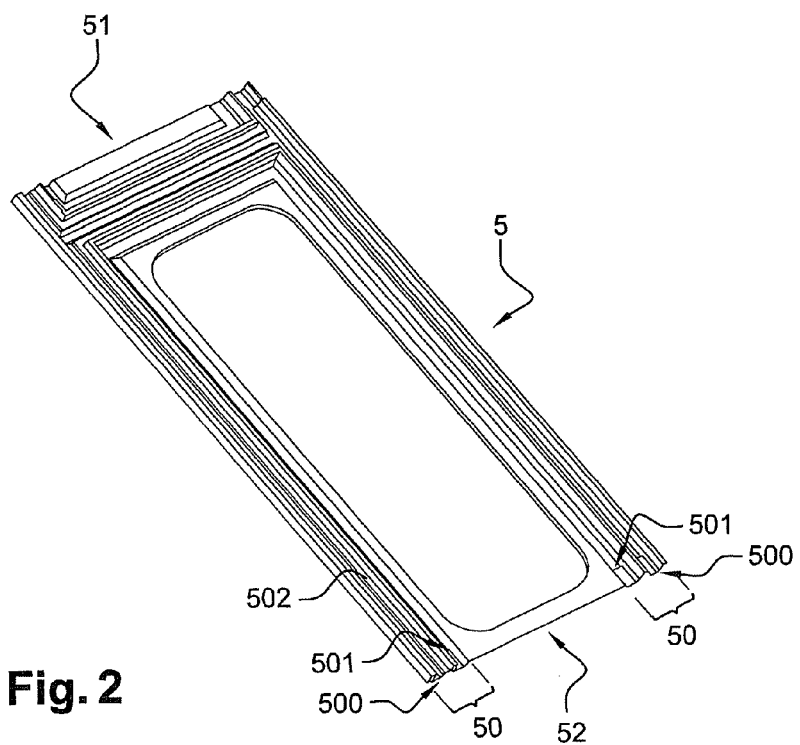
FIG. 2 is a diagrammatic representation in perspective of a frame according to one inventive embodiment.
Figure 9:
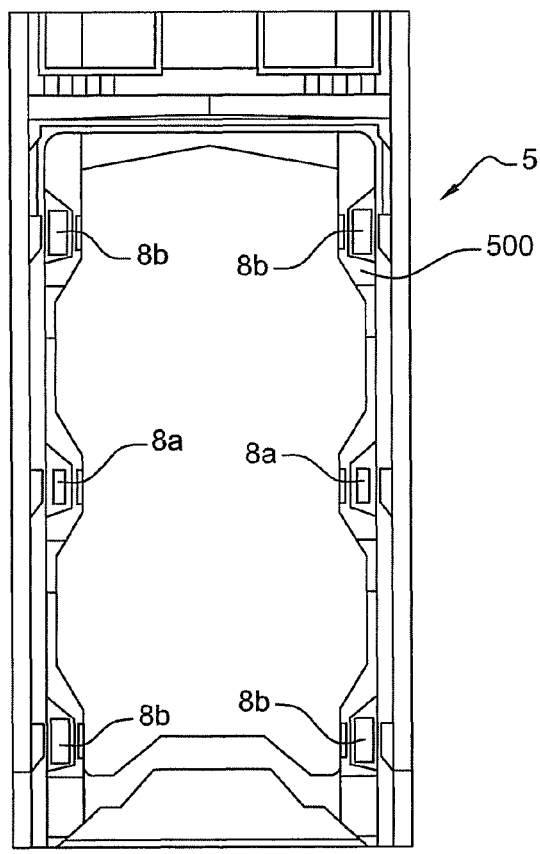
FIG. 9 is a diagrammatic representation of a frame according to one inventive embodiment seen from above.

The frame 5, shown in FIG. 2, is formed in particular by at least two longitudinal sections 50 intended to be arranged in the direction of the pitch of the roof, and upper 51 and lower 52 transverse sections, the terms "upper" and "lower" referring to the direction of the pitch. In fact this frame is cast in one piece. It is made typically from anti-UV treated thermoplastic, by thermo-forming for example. It may in particular be made of polyethylene. As can be observed in FIG. 2, or again in FIG. 9, the frame 5 is completely openwork, or, in other words, it is devoid of all material except for the sections 50, 51 and 52 which define it. The openwork nature of the frame therefore means that condensation phenomena, traditionally seen with traditional securing devices, can be reduced.

The only function of the frame 5 is, on the one hand, to accommodate and secure the solar panels to the fixture 2, and on the other hand, to seal the roof accommodating them.

Figure 3:
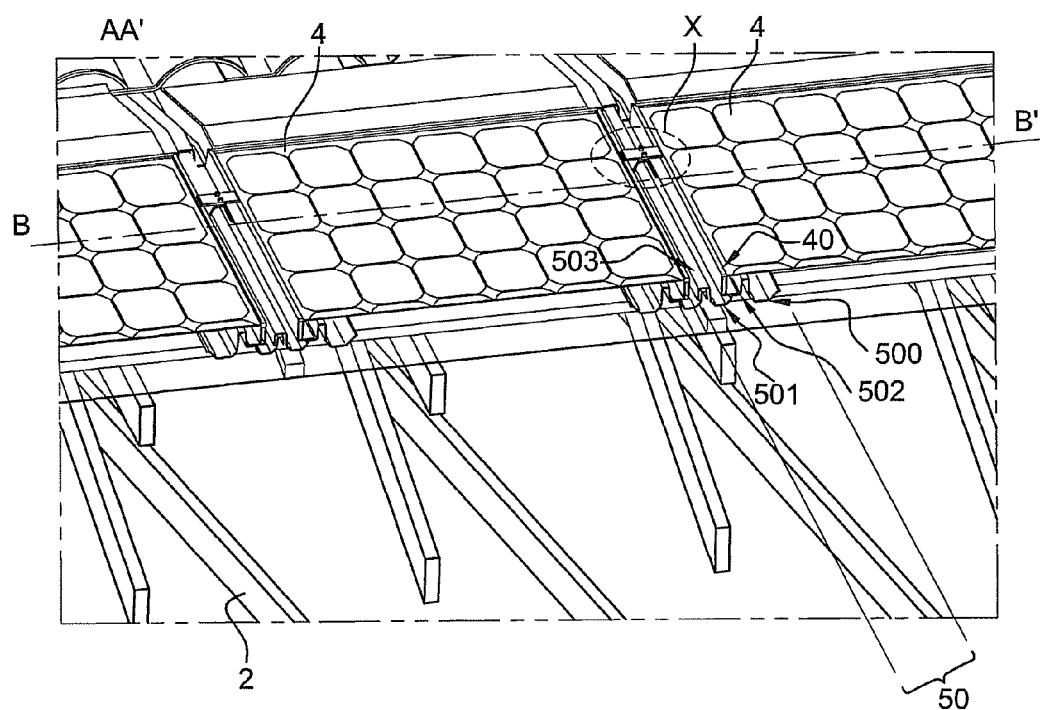
FIG. 3 is a diagrammatic view in partial cross-section of the roofing in FIG. 1 along the axis AA'.
Figure 6A:
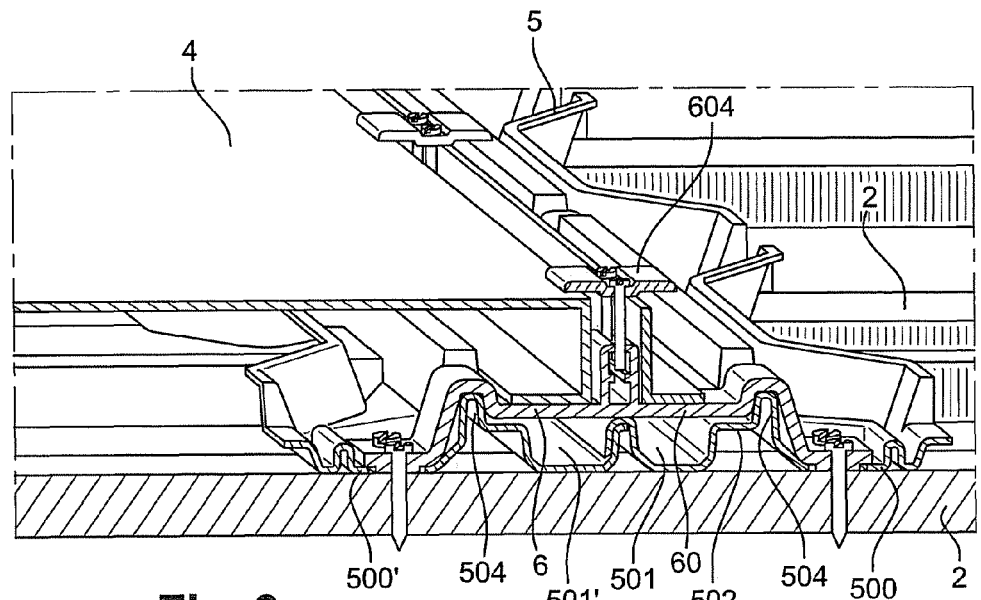
FIGS. 6a and 6b are diagrammatic views in perspective and in cross-section respectively along the axis BB' of the portion referenced as X in FIG. 3, showing the covering between two adjacent frames placed side by side and the securing and tightening means according to one inventive embodiment.
Figure 6B:
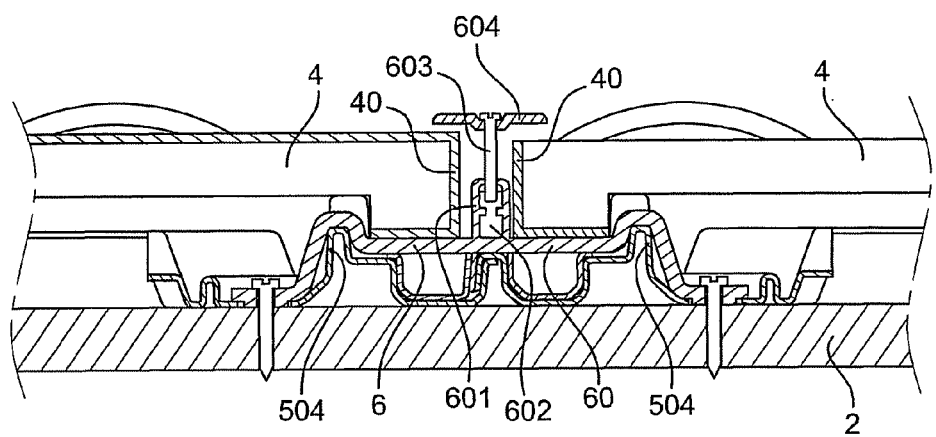

As may be seen in FIGS. 3, 4 and 6, each of the longitudinal sections 50 is formed in particular of an internal longitudinal chute 500, whereof one of the lateral edges is connected to one of the lateral edges of an external longitudinal chute 501 by means of a longitudinal support surface 502. The internal 500 and external 501 chutes are intended to rest on the fixture 2.

The external chutes 501 are intended in particular for rainwater runoff, and the internal chutes 500 are intended in particular for the recovery of condensate, which is liable to form under the roof so defined.

Figure 4A:
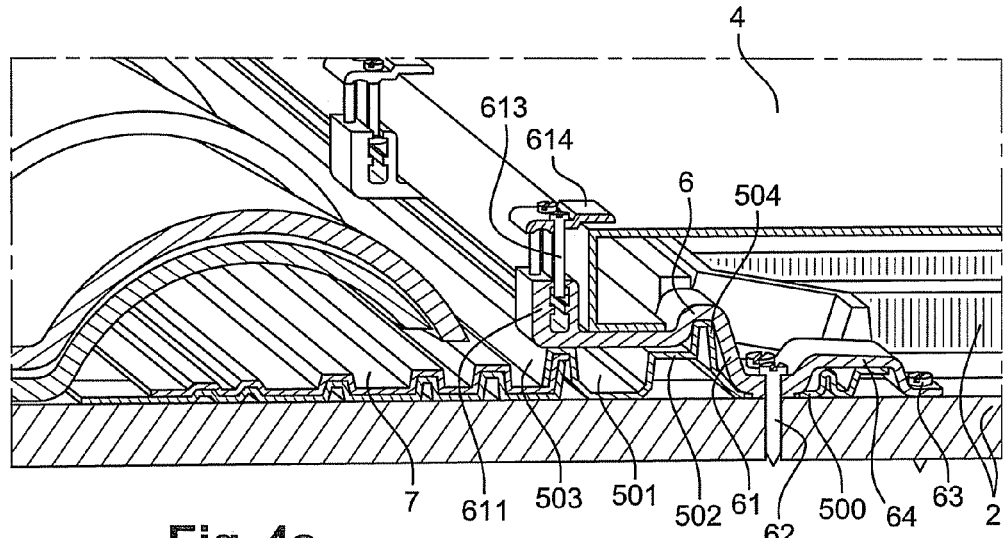
FIGS. 4a and 4b are diagrammatic views in perspective and in cross-section respectively along the axis AA' of the portion referenced as Y in FIG. 1.
Figure 4B:
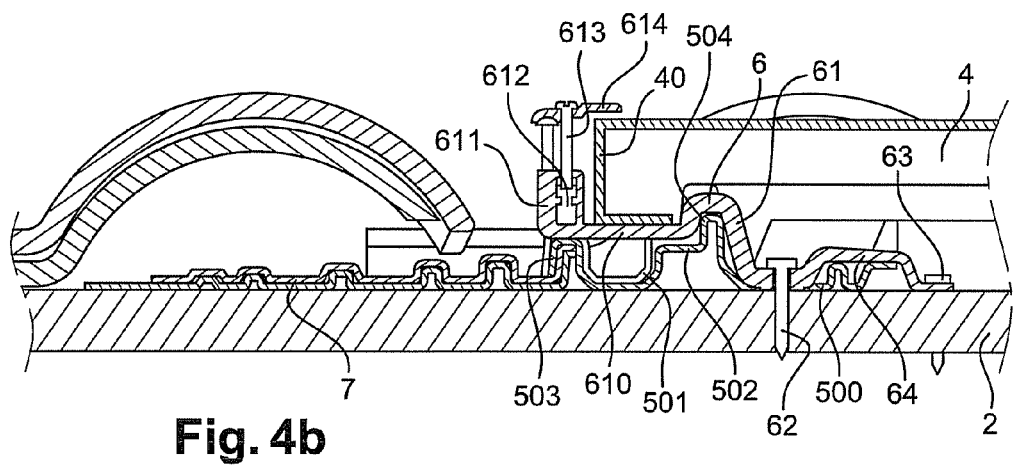

Additionally, with reference to FIGS. 4a and 4b, the free lateral edge 503 of the external chute 501 of each of the longitudinal sections 50 forms an upward projecting chevron structure. To guarantee a sealed junction between two adjacent frames placed side by side, i.e. in a direction according to the direction of the pitch (as shown in FIGS. 4a and 4b), or with a flashing 7 (as shown in FIGS. 4a and 4b), the free lateral edges 503 of the longitudinal sections 50 of a frame are designed so as to allow either a covering on the left-hand side, or a covering on the right-hand side. The terms "left" and "right" refer to a direction perpendicular to the direction of the pitch.

To facilitate the manufacture of the frame 5, the lateral edge 504 of each internal longitudinal chute 500 which is connected to the support surface 502, may also have an upward projecting chevron structure. For example, as shown in FIGS. 4 and 6, the internal chute and the external chute are of similar shape comparable to a sinusoid.

Furthermore, given its special chevron shape, the lateral edge 504 may be used to support a part of the lower face of the panel, and further forms a barrier seal restricting the flow of fluids other than condensate in the internal chute.

To guarantee a better seal to the roofing, the frame 5 is rigidly connected to the fixture by means of screws cooperating with securing lugs passing through machined bores 8 (FIG. 9) made in the walls forming the bottom of the internal chutes 500. Put another way, such machined bores 8 are never provided at points where rainwater is gathered and collected, since the external chutes 501 are devoid thereof.

Figure 5:
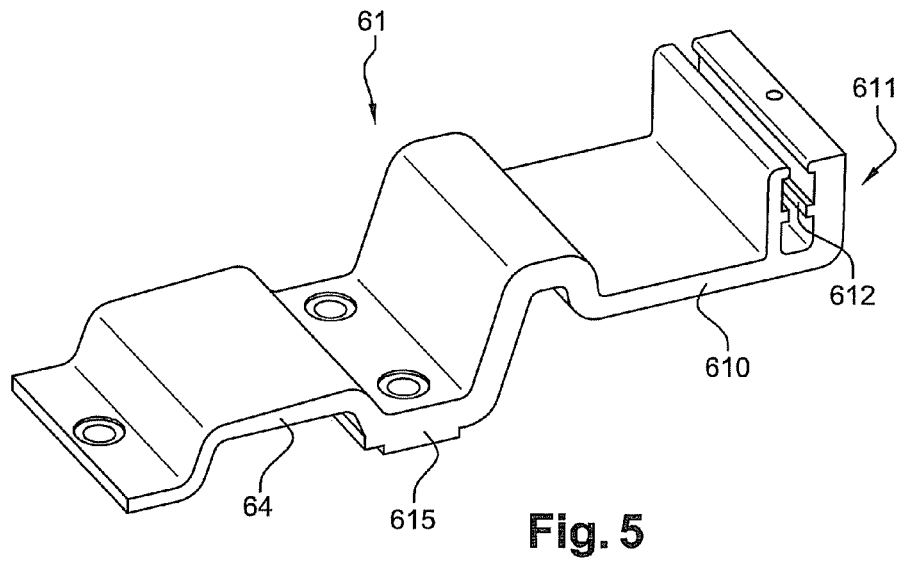
FIG. 5 is a diagrammatic representation in perspective of the securing lug employed in FIGS. 4a and 4b.
Figure 7:
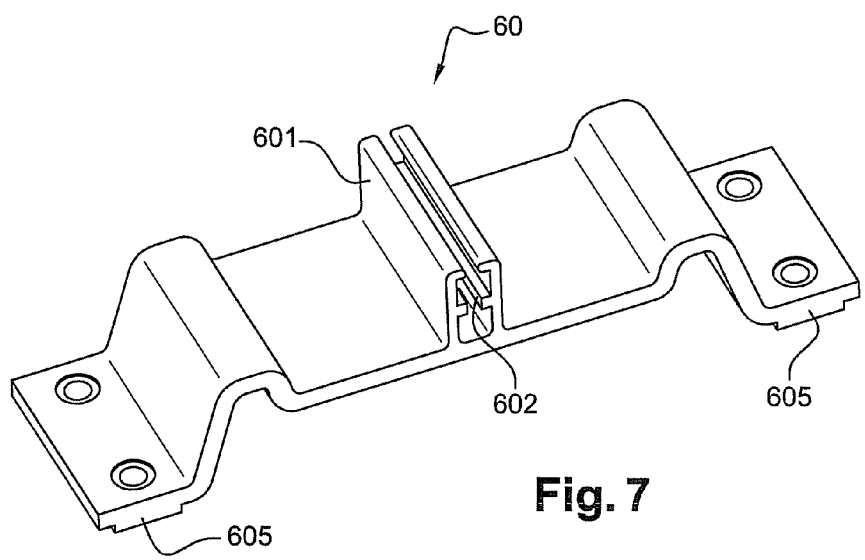
FIG. 7 is a diagrammatic representation in perspective of the securing lug employed in FIGS. 6a and 6b.

Furthermore, to hold the panel 4 on the frame 5, tightening means 6 are employed. These means 6 also secure the frames to the fixture. They include first of all a securing lug. This is a single securing lug 61, in the situation where the securing occurs in the vicinity of a flashing (FIGS. 4a and 4b; FIG. 5), or a double lug 60 in the situation where said means are used to secure two adjacent panels (FIGS. 5a and 5b; FIG. 7).

These lugs or tangent plates are intended to be rigidly connected to the longitudinal sections 50 of the frame 5, and additionally, actually secure the frame 5 to the fixture.

Put another way, the securing lugs 60, 61 fulfill a dual function:
securing the frame 5 to the roof, and in particular to the roofing framework;
securing the panels 4 to the frame 5 in cooperation with the lugs 614.

Thus, as regards the embodiment described in relation to FIGS. 4a and 4b, it may be seen that the lug 61 is secured to the fixture by means of screws 62, 63, passing through one of the machined bores 8 provided in the internal chute 500 of the frame, and in an even more internal zone relative to the frame respectively. The lug actually secures the frame to the fixture by the pressure it exerts through its connection zone 64 extending between the two screws 62, 63.

Each lug 61 has, in the vicinity of its free end, and for the purposes of actually securing the panel:
a first portion 610 intended to rest on the support surface 502 and forming a housing for fitting in the lower part of the longitudinal selvage 40 to be held,
a second portion 611 extending from the free edge of the lug, substantially along a perpendicular direction, and defining a housing 612 capable of cooperating with a screw for securing 613 and tightening a secondary lug 614 of the panel 4 by trapping, thereby preventing these longitudinal selvages of the panel from lifting.

Additionally, each lug 61 is provided with a positioning and securing pin 615, intended to pass through one of the machined bores 8 of the frame 5, in order to secure the latter also to the fixture.

Figure 11:
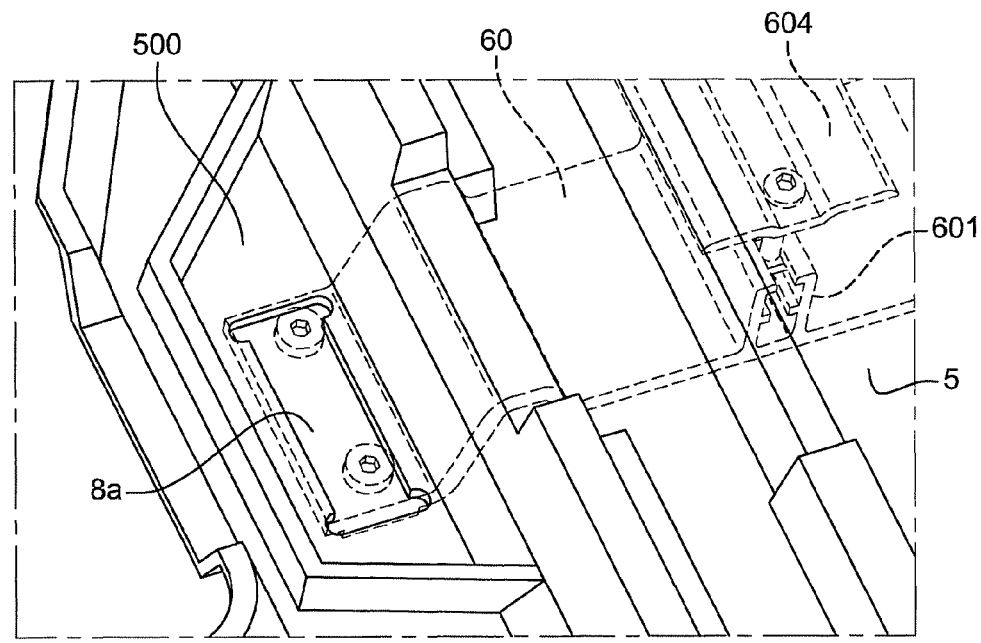
FIG. 11 is a view similar to FIG. 10, but corresponding to the installation of a securing lug in one of the central machined bores of said frame.

The dimensions of this positioning and securing pin correspond substantially to those of the central machined bores 8a of the frame 5. Put another way, only a small frame play is possible, once the securing lug is in position (see FIG. 11), the pin 615 then cooperating by contact with the walls defining the machined bore.

Figure 10:
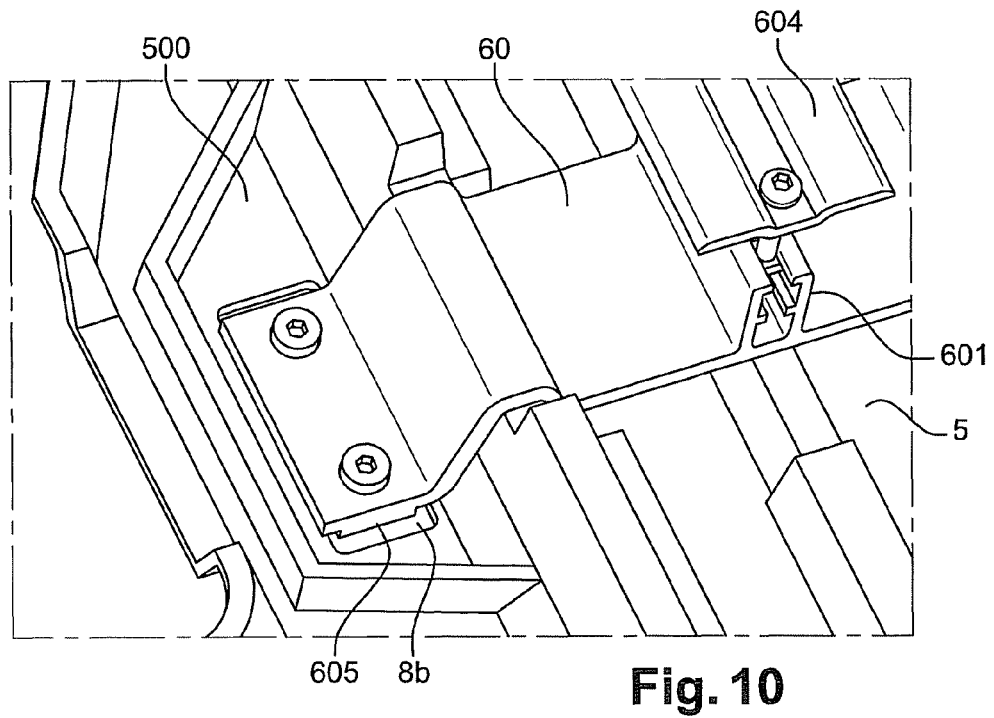
FIG. 10 is a diagrammatic representation of the positioning of a securing lug in one of the machined bores of the frame, and particularly a machined bore other than the central one.

Conversely, the dimensions of the machined bores 8b other than the central ones of the frame 5 are larger than those of the securing pin 615 (see FIG. 10). Typically, a play of 3 millimeters ($\approx 0.118$ inches) exists along the two main directions of the machined bore around the pin 615. Thereby, even though the positioning and securing of the frame 5 to the fixture are substantially set at the central zone thereof because of the substantial correspondence between the dimensions of said pin with those of the central machined bores 8a, the frame 5 is however capable of expanding relatively easily by adopting larger dimensions for the machined bores 8b other than the central ones, i.e. machined bores located in the vicinity of the ends of the frame 5. At this level, there is therefore no cooperation between the pin 615 and the walls defining the machined bore 8b. It is indeed more straightforward to modify the dimension of the machined bores (by thermoforming) and to keep the securing lugs 61 standard.

The securing of two adjacent panels is based on the same principle, using the securing lugs 60. Therefore, the lug 60 conforms substantially in shape to the shape of two adjacent longitudinal sections 50, which incidentally, overlap (see FIGS. 6a and 6b).

The two free ends of the lug 60 are secured to the fixture, each through a respective through orifice or machined bore 8 of the two adjacent frames.

Additionally, said lug exerts pressure on the respective portion 504 of the two adjacent longitudinal sections, thereby securing the corresponding frames to the fixture 2.

As with the securing lug 61, the securing lug 60 is supported on the overlap zone of the two adjacent longitudinal sections. At this level, it also has a portion 601, extending substantially along a perpendicular direction relative to its main direction, and defining a housing 602 capable of cooperating with a securing and tightening screw 603 of a secondary lug 604 of two adjacent panels 4 by trapping, thereby preventing these longitudinal selvages of the panel from lifting.

Furthermore, and here too as with the securing lug 61, the securing lug 60 is provided at its two ends, with a positioning and securing pin 605, each of these pins being intended to pass through one of the machined bores 8 of the frame 5, also for the purpose of securing it to the fixture. Depending on the point at which said securing lug is implanted, said pin may or not be able to cooperate by contact with the walls defining said machined bore (Cf above).

Figure 8:
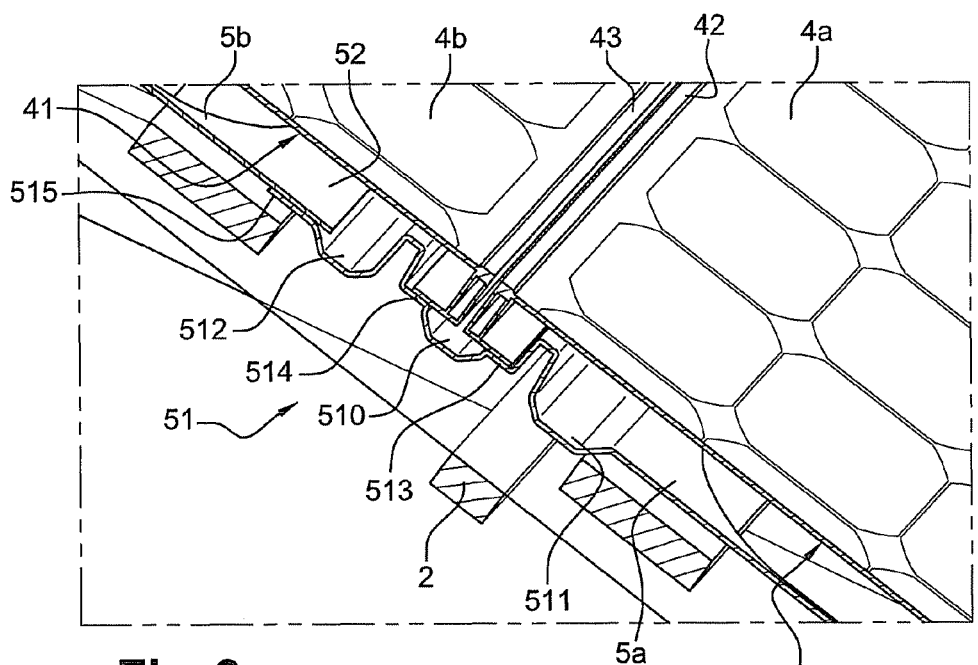
FIG. 8 is a diagrammatic view in cross-section of the upper transverse section according to one inventive embodiment.

According to one embodiment shown in FIG. 8, the upper section 51 has at least one central transverse chute 510 and first and second lateral transverse chutes 511, 512 intended to rest on the fixture. The first transverse chute 511 is intended to be positioned opposite the lower face 41 of a first panel 4a, and the second transverse chute 512 is intended to be positioned opposite the lower face 41 of a second panel 4b arranged above the first panel 4a in the direction of the pitch.

The first transverse chute 511 is connected to one of the edges of the central chute 510 by means of a first support surface 513 intended to support the upper transverse selvage 42 of a first solar panel 4*a*. The second transverse chute 512 is connected to the other edge of the central chute 510 by means of a second support surface 514 intended to support the lower transverse selvage 43 of a second panel 4*b*.

Additionally, the upper section 51 includes a transverse covering surface 515 extending from the free edge of the second transverse chute 512. This transverse covering surface 515 of the upper section of a frame may in particular support the lower section 52 of another adjacent frame placed above said frame in the direction of the pitch. For example, a second frame is placed on the fixture above a first frame 5*a* so that the lower section 52 of the second frame rests on the transverse covering surface 515 of the first frame 5*a*.

To this end, the lower transverse section 52 of each frame may be formed of a plane surface connecting the lower end of the longitudinal sections 50 of the frame (FIG. 2). Preferably, this plane surface extends between the free lateral edges of the internal chutes 501 of the longitudinal sections 50.

Additionally, to optimize the covering of the upper transverse section and provide a better seal, the frame is such that the upper ends of its longitudinal sections may be covered by the lower ends of the longitudinal sections of another adjacent frame placed above in the direction of the pitch.

Furthermore, the edge of the first transverse chute 511 connected to the first support surface also forms an upward projecting chevron structure and is capable of preventing any sliding, in the direction of the pitch, of the upper selvage of the panel.

To guarantee optimum rainwater runoff, the external longitudinal chutes 501 are connected to the central chute 510 so as to form a continuous channel, to allow the water contained in the central transverse chute to drain into the external longitudinal chutes. The external longitudinal chutes 501 and the central chute 510 are arranged so as to form a continuous H-shaped central channel (FIG. 2).

The rigid connection structure thus proposed therefore comes in the form of a plurality of frames, obtained very simply by thermo-forming, intended to be secured directly to a fixture, and fitted with chutes and supports for the selvages of the solar panels. These frames overlap in twos along the two main directions, in the direction of the roof pitch, and along a direction perpendicular thereto respectively.

The arrangement of the chutes enables a transverse and longitudinal runoff of the water, and further enables condensate recovery. Owing to the presence of an actual rainwater runoff zone between two adjacent panels, the drainage of said water is no longer limited merely to the lateral flashings of a panel array. There is therefore no longer any restriction in terms of panel array width.

Additionally, the components for securing frames to the fixture are systematically positioned in a dry zone, in the sense that the corresponding screws interact with said frames on their internal chute, separated from the external chute by a barrier 504.

The structure of the tightening and securing means facilitates the installation of the frames on the fixture and the securing of the panels to the frames.

Additionally, the installation of the rigid connection structures and the solar panels on a fixture is straightforward, and is only based on the same covering principle as for tiles, so that no sealing joint is required.

Figure 12:
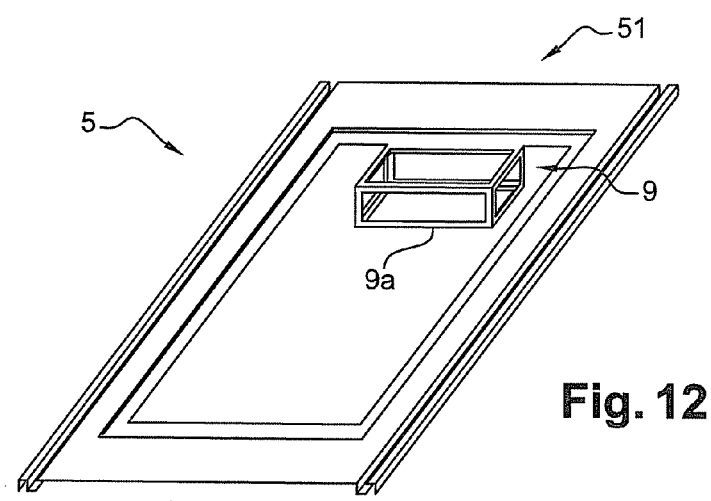
FIGS. 12 to 14 show diagrammatically three embodiments of the inventive frame capable of accommodating a micro-inverter.
Figure 13:
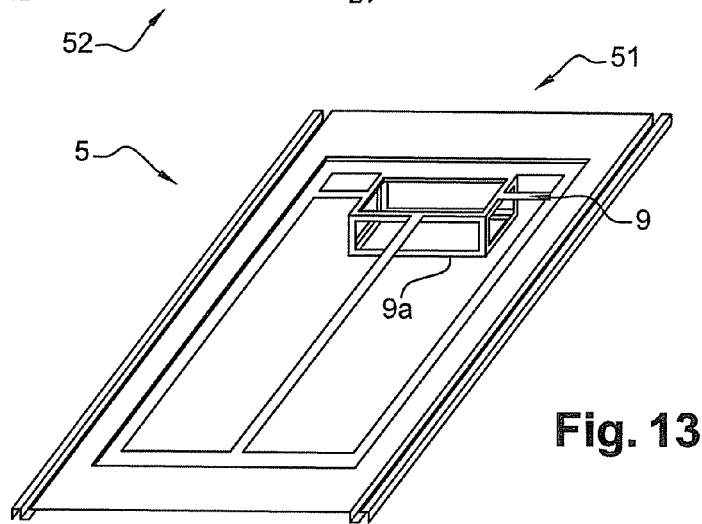
Figure 14:
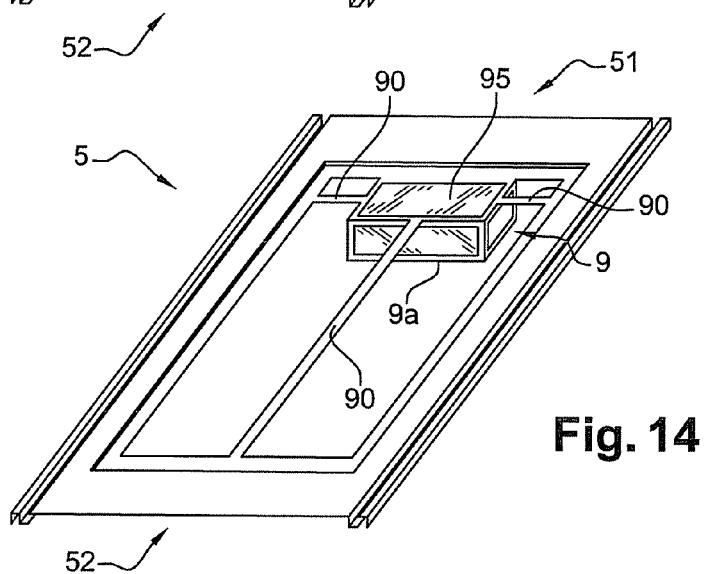

According to one particular inventive embodiment, more specifically described in relation to FIGS. 12 to 14, the frame 5 includes moreover a receptacle-forming element 9 arranged inside said frame 5 and intended to support or accommodate a micro-inverter. This receptacle-forming element 9 comprises thermo-formed frames 9*a* that come in the form of a rectangular parallelepiped, whereof one of its upper lengths is implemented by the upper transverse section 51. The size of the rectangular parallelepiped is substantially larger than a conventional micro-inverter, such that the latter is fitted into and held in said receptacle-forming element 9 without the need to use securing elements, such as screws for example. Each of the faces of the rectangular parallelepiped is open so as to leave the way free and not hinder the connections starting from the inverter. Thus the upper plane of the rectangular parallelepiped 9 and the general plane in which the openwork zone of the frame 5 lies are merged.

In the example described, the assembly comprising the frame 5 and the receptacle-forming element 9 is cast in one piece. It is typically made out of an anti-UV treated thermoplastic material, by thermo-forming for example.

With reference to FIG. 13, which shows a second embodiment of the frame 5 including a receptacle-forming element 9 for micro-inverter, said frame includes moreover reinforcement elements comprising strips 90 of thermoplastic connecting the upper sides of the receptacle-forming element to the sections of said frame.

With reference to FIG. 14, the receptacle-forming element 9 accommodates in a fitted way a micro-inverter 95. This may be rigidly connected to the bottom of the receptacle 9 by bonding.

Alternatively, once the micro-inverter 95 is installed in the receptacle 9, the latter is filled with an epoxy resin, silicone or polyurethane, constituting a layer for discharging the heat generated by the micro-inverter.

According to another inventive embodiment, the rigid connection structure may include flashings comprising a plurality of element types, as shown in relation to FIGS. 15 to 20.

The particular purpose of these different flashing units is to adapt the specific inventive rigid connection structure to slate or flat tile roofs.

Figure 15A:
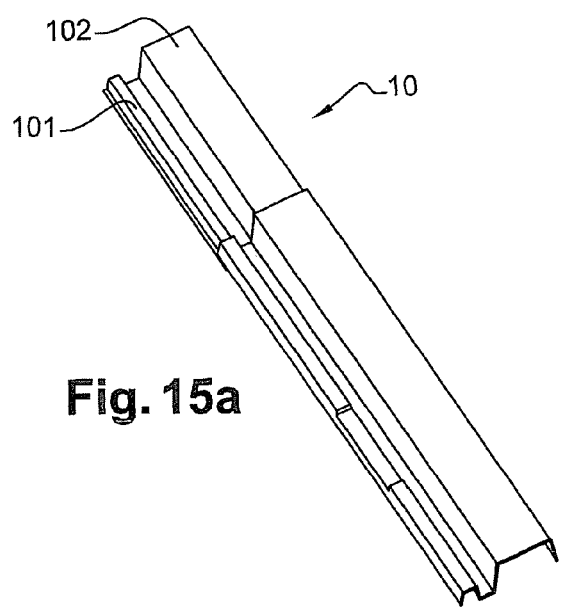
FIGS. 15a and 15b show diagrammatically one of the elements belonging to the lateral assembly of the flashings according to one inventive embodiment more particularly intended for the integration of panels on a roof with flat tiles or slates.
Figure 15B:
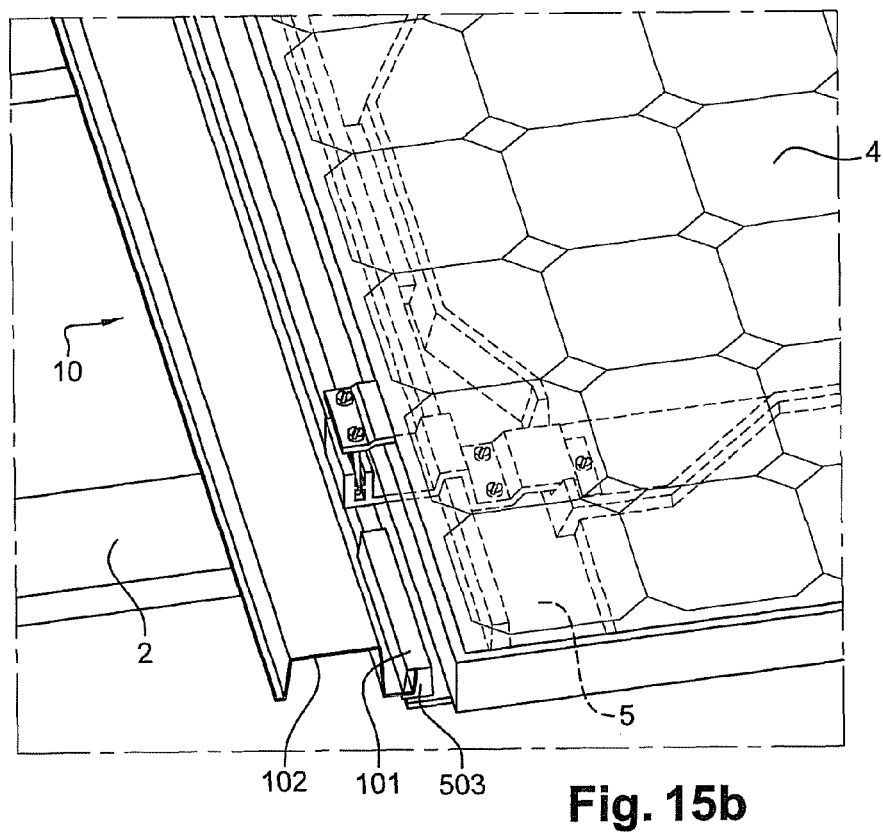

Thus, and to this end, these flashings include first of all a first set of components, intended to come into position on the lateral edges of the frame (see FIGS. 15-17).

Figure 16A:
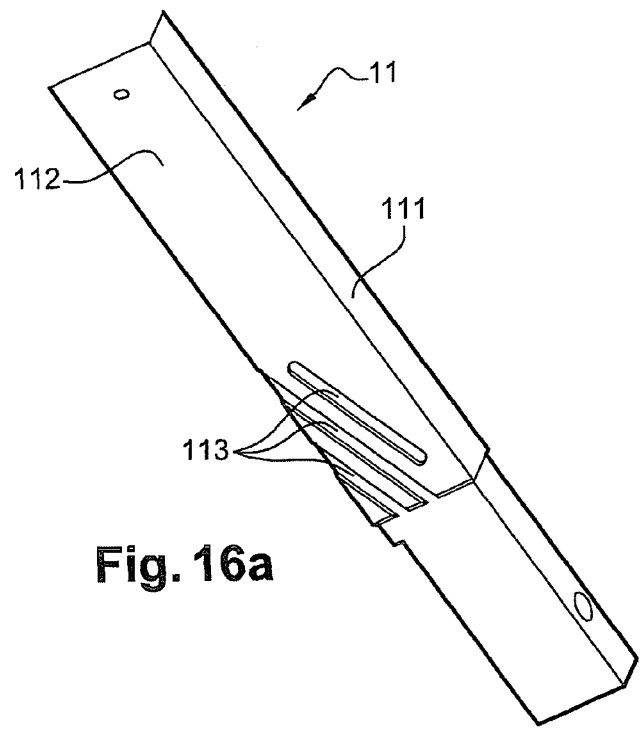
FIGS. 16a and 16b show diagrammatically elements complementary to the elements shown in FIGS. 15a and 15b.
Figure 16B:
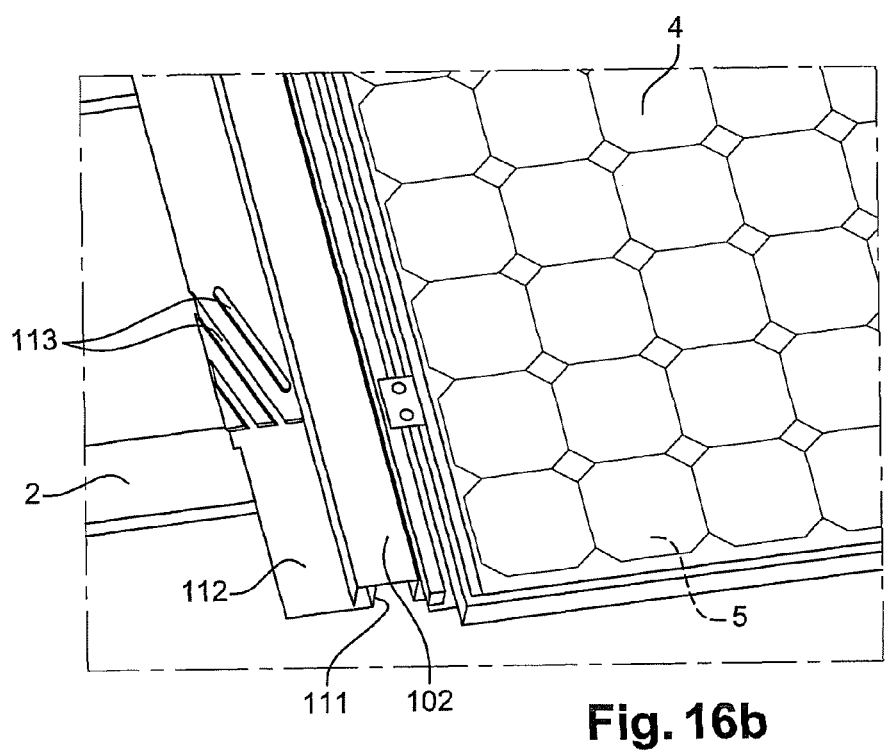

These components comprise respectively:
- one or more sealing components 10, fitted with a projection 101, of reduced width, capable of cooperating with the complementary shape 503 of the longitudinal section of a frame 5, and a second projection 102, parallel with the first projection 101, and of appreciably more substantial width;
- one or more support components 11, of generally plane shape, and having on one of its edges an angle section 111, capable of being inserted into the volume defined by the second projection 102 of the sealing component 10, as can be clearly seen in FIGS. 16*b* and 16*a*.

Figure 17A:
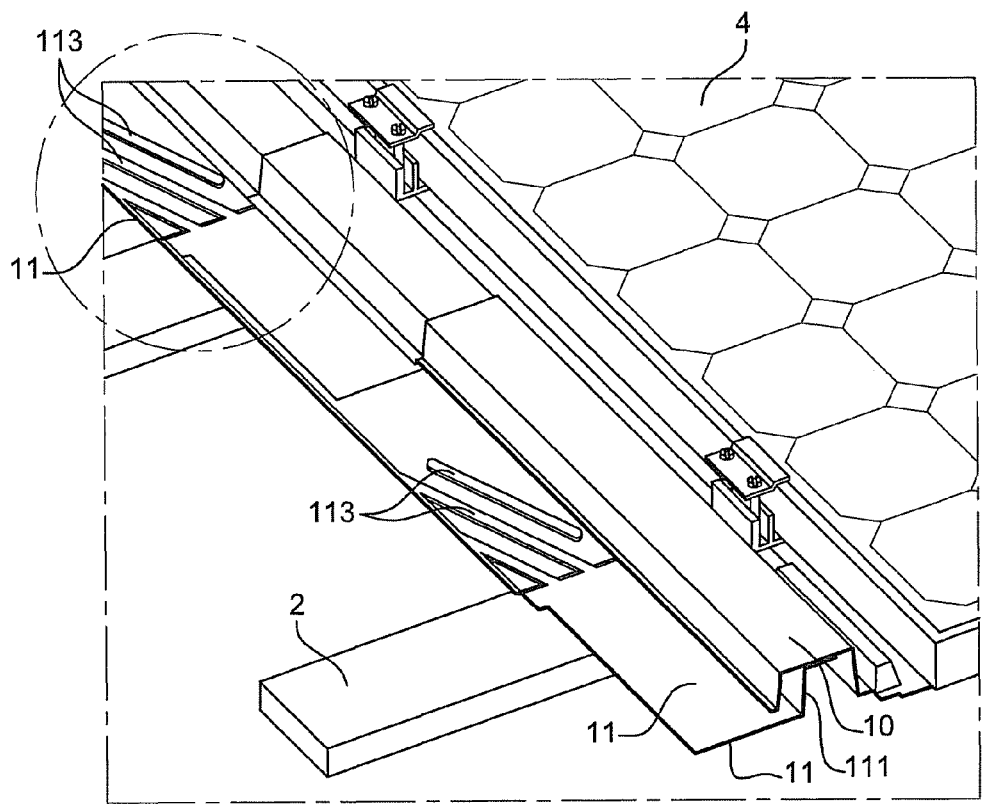
FIGS. 17a and 17b show diagrammatically the cooperation of two previous components with each other, for the purposes of conferring flatness on the flat tile or slate accommodation zone.
Figure 17B:
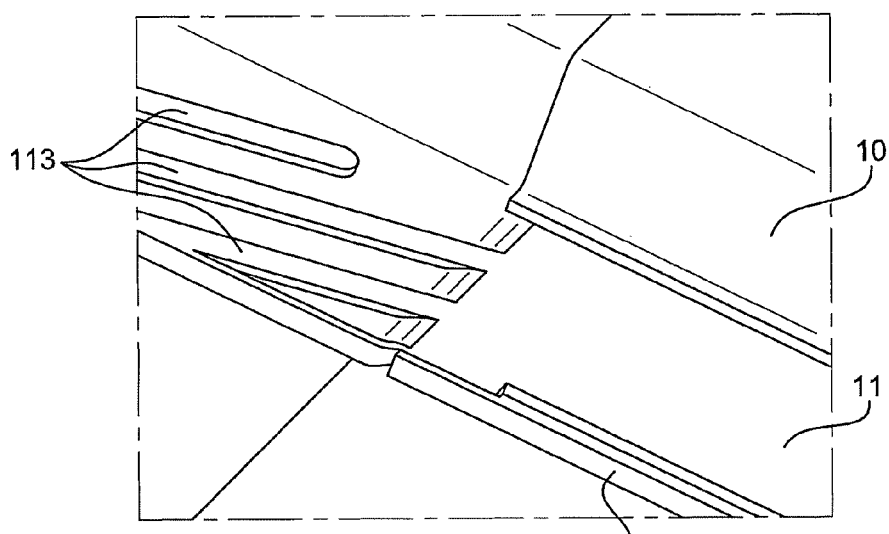
Figure 18A:
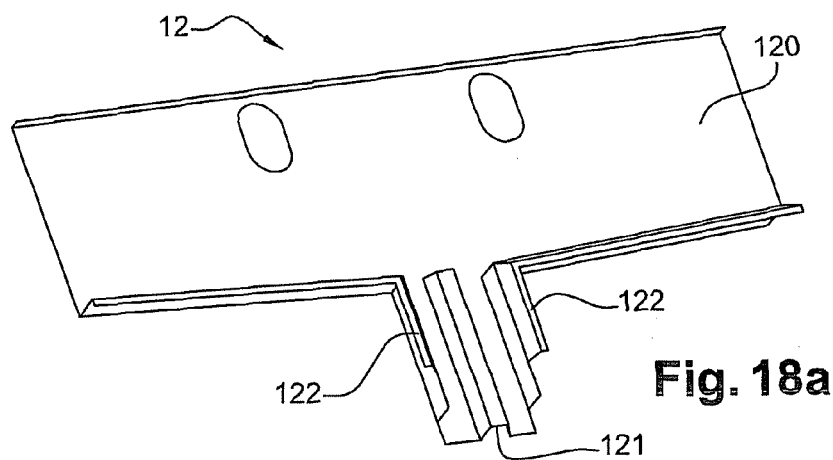
FIGS. 18a and 18b show diagrammatically one of the elements belonging to the upper assembly of the flashings in the preceding embodiment.
Figure 18B:
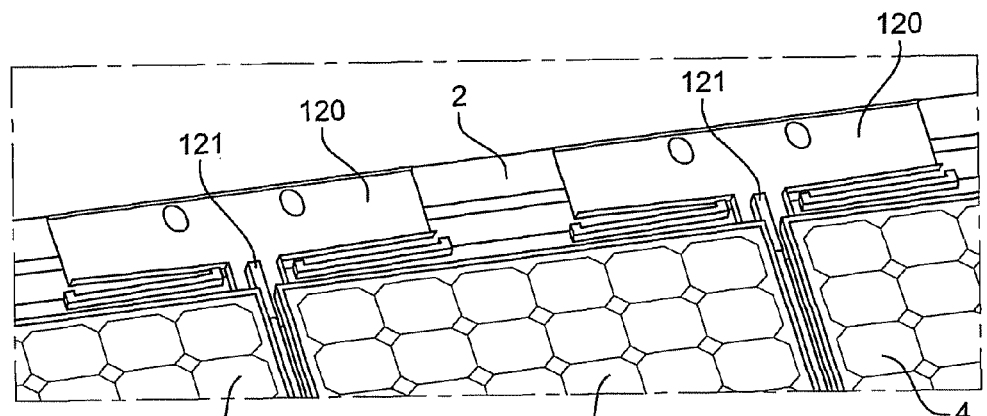
Figure 19:
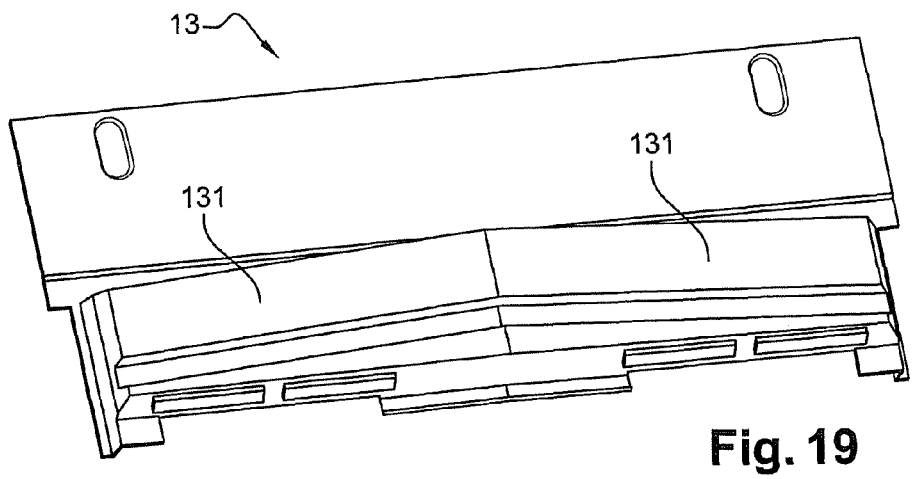
FIG. 19 shows diagrammatically another element of the upper assembly.

The plane part 112 of the support components 11 additionally has projecting zones or raised pillars 113, that have a typical height relative to the plane surface 112 of between 1 and 20 millimeters (≈0.039 and 0.787 inches), and preferably about 6 millimeters (≈0.236 inches). The purpose of these pillars, as can be clearly seen in FIGS. 17*a* and 17*b*, is to keep the accommodation zone of the edge of the flat tiles or slates perfectly plane, since they make it possible to take into account the covering of one of the support components 11 by a component of the same type.

Additionally, the positioning of said components 11 relative to the frame 5 may be controlled by simply sliding, the angle section 111 with which they are fitted being able to move inside the volume defined by said second projection 102 of the seal components 10.

A second set of components is described in relation to FIGS. 14 and 15. Thus, in FIG. 18 a component 12 has been described that is intended to come into position in the zone or section above the junction between two adjacent frames. To this end, it is fitted with a central projection 121, capable of covering at least partially the overlap zone of two adjacent frames on their respective longitudinal sections.

This component 12 further comprises a plane upper part 120, secured to the fixture.

Lastly, on either side of the central projection 121, it comprises inclined wings 122, intended, as described hereinafter, on the one hand, to cooperate with a complementary upper flashing component, also to channel the runoff water in the central zone, i.e. in the zone separating two adjacent frames in the transverse direction.

This component 12 is therefore intended to cooperate with a complementary component 13 (see FIGS. 19 and 20), which is only located at the base of a single frame 5. It has a dihedral zone 131 immediately adjoining the solar panel, when the assembly is in position on the fixture, this dihedral zone being here too intended to direct the rainwater into the central zone separating two adjacent panels, and therefore in the direction of the central water discharge flume. Its special shape means that said water can be divided in two, and therefore, additionally leakage risks can be reduced.

Figure 20A:
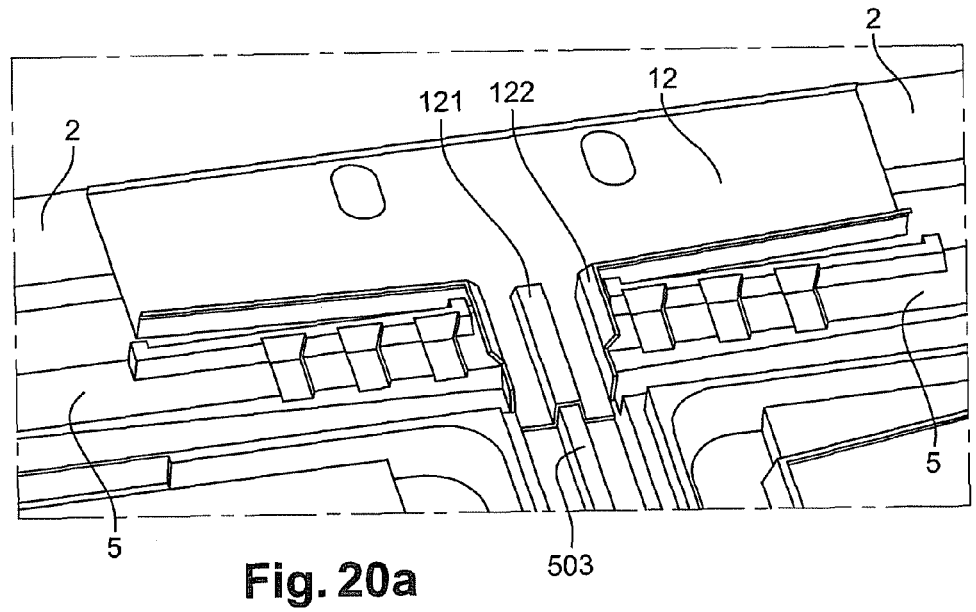
FIGS. 20a to 20c show the steps in the installation of the upper assembly elements.
Figure 20B:
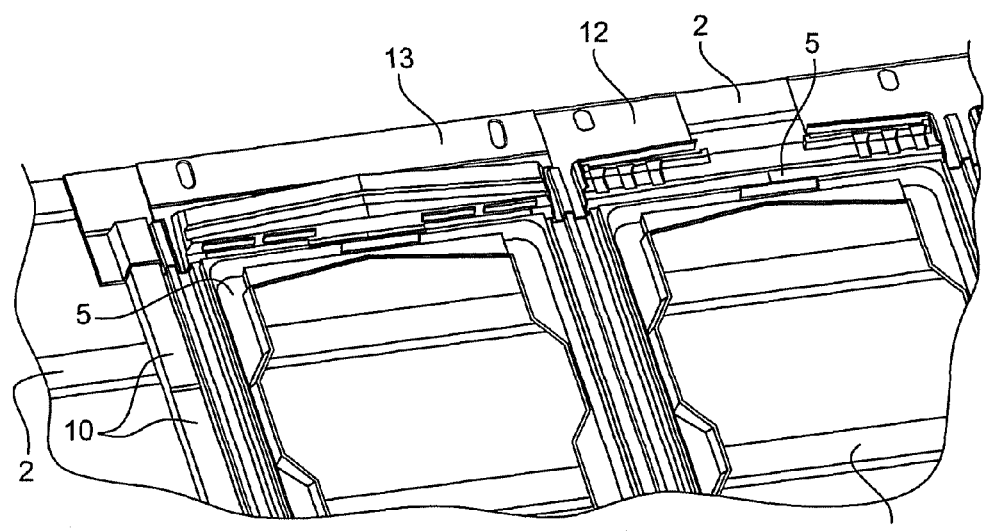
Figure 20C:
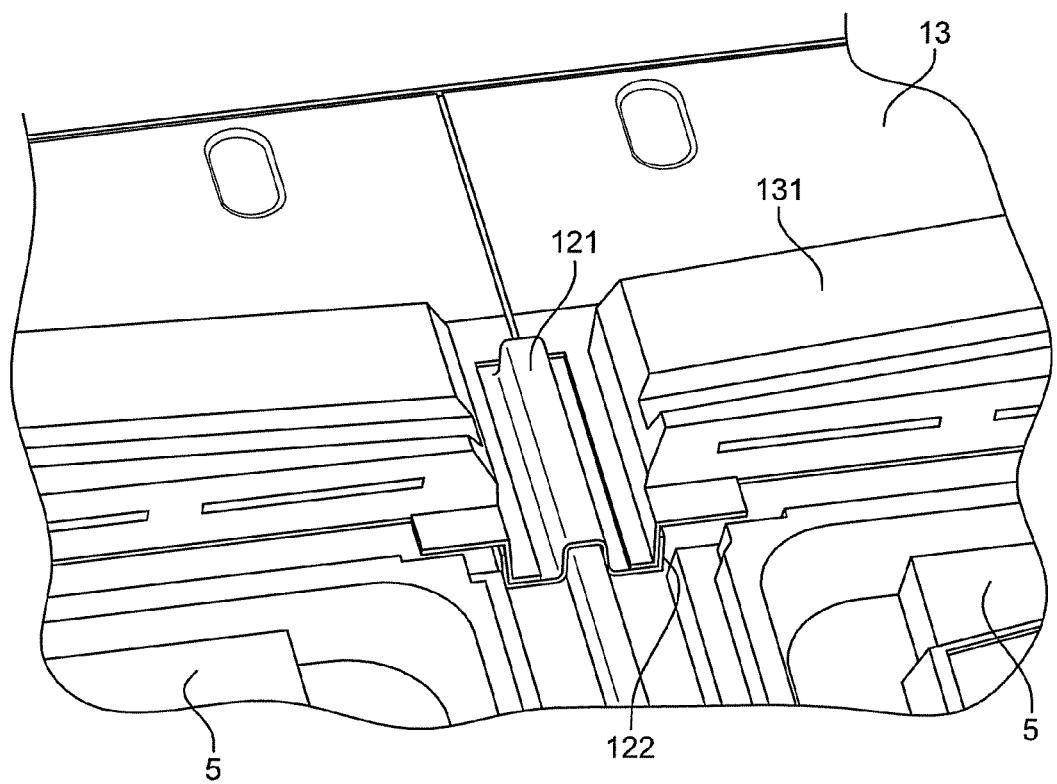

FIGS. 20a to 20c show the order of positioning of the different components belonging to the upper set of flashings. They show angle components 14, positioned on and therefore superimposed over the lateral components 10 and 11, but under the upper component 131.

The full significance of the inventive structure can now be seen, since it can be used, by employing straightforward means for implementation and installation on a roof, to obtain the required integration of solar panels, whatever the existing roof type, and guaranteeing furthermore the requisite seal.

The invention claimed is:

1. A device for integrating solar panels on a fixture, the device comprising:
   a plurality of frames intended to accommodate the solar panels, added to the fixture, said frames being defined by a peripheral edge fitted with linear elements that project relative to a plane in which the frames are set; said frames being formed by at least two longitudinal sections intended to be arranged in a direction of a roof pitch, and upper and lower transverse sections, each of the longitudinal sections having at least an external longitudinal chute and an internal longitudinal chute, said external longitudinal chute and said internal longitudinal chute being connected to each other at a respective lateral edge of said external longitudinal chute and said internal longitudinal chute by means of a longitudinal support surface, said external longitudinal chute and said internal longitudinal chute being intended to rest on the fixture;
   tightening means for holding said panels on the frames;
   means for securing the frames to the fixture;
   wherein the frames are openwork and cover each other or partially overlap each other at the peripheral edge that defines said frames, laterally on the one hand and in the direction of the roof pitch on the other hand, the linear projecting elements with which the frames are fitted cooperating with each other in order to form a first barrier seal,
   wherein the tightening means are positioned by a dry zone, said dry zone being defined by the internal longitudinal chute, separated from the external longitudinal chute,
   wherein the means for securing the frames to the fixture include securing lugs capable of cooperating with through orifices or machined bores implemented in a wall forming a bottom of each of the internal longitudinal chutes of the frames, and
   wherein the lateral edge of the internal longitudinal chute which is connected to the longitudinal support surface forms an upward projecting chevron structure, additionally allowing a part of a lower face of the solar panel to be supported and a second barrier seal to be formed.

2. The device for integrating solar panels on a fixture as claimed in claim 1, wherein the frames define a continuous or single piece chute, providing continuity between transverse chutes oriented perpendicular to the direction of the roof pitch and the longitudinal chutes oriented in the direction of the roof pitch.

3. The device for integrating solar panels on a fixture as claimed in claim 1, wherein the free lateral edge of the external longitudinal chute of the frames forms an upward projecting chevron structure, capable of covering the free lateral edge of the external longitudinal chute of an adjacent frame.

4. The device for integrating solar panels on a fixture as claimed in claim 1, wherein:
   the machined bores or through orifices provided in the internal longitudinal chutes of the frame have different dimensions, according to whether said machined bores or through orifices are implemented in a central position or in an end position,
   and the securing lugs are fitted with at least one positioning and securing pin, capable of passing through said machined bores and able to cooperate by contact with the walls defining said machined bores.

5. The device for integrating solar panels on a fixture as claimed in claim 1, wherein the device further includes flashings, capable of cooperating with the longitudinal and transverse sections defining the frame, said flashings being fitted with projecting elements able to cooperate with the chutes of said the longitudinal and transverse sections, and having a plane extension for the accommodation of tiles, including flat tiles or slates.

6. The device for integrating solar panels on a fixture as claimed in claim 1, wherein the device further comprises flashing components, and the frames and the flashing components are made of plastic material by thermo-forming.

7. The device for integrating solar panels on a fixture as claimed in claim 6, wherein the plastic material includes a plurality of layers of different polymers.

8. The device for integrating solar panels on a fixture as claimed in claim 6, wherein the plastic material integrates at least one material that has protective properties against ultraviolet radiation.

9. The device for integrating solar panels on a fixture as claimed in claim 6, wherein the plastic material is selected from the group that includes polyethylene, ABS (acrylonitrile butadiene styrene), PMMA (polymethyl metacrylate), polycarbonates, polyurethane, vinyl polychloride, polyamide, polystyrene, polyester and polyepoxides.

10. The device for integrating solar panels on a fixture as claimed in claim 1, wherein the frame integrates a receptacle-forming element, intended to at least one of support and accommodate a low voltage inverter or micro-inverter.

11. The device for integrating solar panels on a fixture as claimed in claim 10, wherein the frame and the receptacle-forming element constitute an assembly cast in one piece made of plastic material, and produced by thermo-forming.

12. The device for integrating solar panels on a fixture as claimed in claim 10, wherein:

the micro-inverter, once positioned in the receptacle-forming element, is embedded in a liquid or soft coating layer which then solidifies, said layer being made of epoxy resin, silicone or polyurethane; or the micro-inverter, once positioned in the receptacle-forming element, is bonded to a bottom thereof or secured by means of screws; or the micro-inverter, once positioned in the receptacle-forming element, is covered by a protective lid; or the micro-inverter, once positioned in the receptacle-forming element, is enclosed in a sealed way and joints are used to form an insulation that satisfies the standards IP55 or IP67 according to the IEC60529 edition 2.1 published by the International Electrotechnical Commission.

13. The device for integrating solar panels on a fixture as claimed in claim 1, wherein the device includes flashings, comprising a plurality of elements, and respectively:

a first assembly including longitudinal components that can be fitted to the external longitudinal chutes provided on the longitudinal sections defining the frame, and in a way complementary thereto, a second assembly including angle components that can be fitted to an intersection between the longitudinal sections and the transverse sections of said frame;

and a third assembly including transverse components that can be fitted to central transverse chutes provided on the transverse section defining the frame in cooperation with the longitudinal sections, and in a way complementary thereto.

14. The device for integrating solar panels on a fixture as claimed in claim 13, wherein at least one of the longitudinal components belonging to said first assembly includes a rib or a pillar arranged to project relative to a plane which contains said longitudinal components, capable of giving the flashing a constant height for the accommodation of tiles or slates.

* * * * *